United States Patent
Odom et al.

(10) Patent No.: US 7,349,884 B1
(45) Date of Patent: Mar. 25, 2008

(54) METHOD AND APPARATUS FOR ELECTRONIC COMMERCE SERVICES AT A POINT OF SALE

(75) Inventors: Pat Odom, Sulphur Springs, TX (US); Tracey Fatland, Sulphur Springs, TX (US); Dolly Gilliam, Como, TX (US); Cheri Barnett, Sulphur Springs, TX (US); Terry Harbin, Sulphur Springs, TX (US); Lionel Joseph Songy, Jr., Destrehan, LA (US); Terry Hair, Bedford, TX (US)

(73) Assignee: GSC Enterprises, Inc., Sulphur Springs, TX (US)

( * ) Notice: Subject to any disclaimer, the term of this patent is extended or adjusted under 35 U.S.C. 154(b) by 1402 days.

(21) Appl. No.: 09/821,441

(22) Filed: Mar. 29, 2001

(51) Int. Cl.
*G06Q 20/00* (2006.01)

(52) U.S. Cl. ...................................... 705/40

(58) Field of Classification Search ............... 701/100; 374/101, 144; 702/130; 60/39.281, 39.15, 60/39.182, 602, 603, 775, 39.27; 123/435, 123/676; 705/16, 17, 18, 21, 23, 24, 35, 705/39, 40, 41, 42, 43, 44, 45
See application file for complete search history.

(56) References Cited

U.S. PATENT DOCUMENTS

| | | | | |
|---|---|---|---|---|
| 5,023,782 A | * | 6/1991 | Lutz et al. ................ | 705/45 |
| 5,053,607 A | * | 10/1991 | Carlson et al. ............ | 705/18 |
| 5,473,143 A | * | 12/1995 | Vak et al. ................. | 235/380 |
| 5,652,802 A | * | 7/1997 | Graves et al. ............ | 382/135 |
| 5,910,988 A | | 6/1999 | Ballard | |
| 6,032,137 A | | 2/2000 | Ballard | |
| 6,119,106 A | | 9/2000 | Mersky et al. | |

* cited by examiner

*Primary Examiner*—Gerald J. O'Connor
(74) *Attorney, Agent, or Firm*—Slater & Matsil, L.L.P.

(57) ABSTRACT

Point of sale transactions can be efficiently processed by use of a point of sale terminal having both image capture and storage capability, as well as other information input capabilities such as a MICR reader, a bar code reader, a keyboard, or similar input device. The system stores an image of the actual transaction documents, such as the bill to be paid and the check by which payment is made, for future reference and verification. In this way, paper copies of the bill need not be archived, and the check can be processed by electronic check conversion, further lowering costs. The electronic transaction information, such as biller identification, account number, payment made, and the like is forwarded from the POS location to a central data processing center in real time and authorization or denial of authorization to accept payment is returned to the POS terminal in real time. Additionally, system updates such as authorized billers, service fee schedules, and the like can be updated in real time, each time a transaction is transmitted from or to the POS terminal. Another advantageous feature is that a single POS terminal can be configured to communicate with multiple service providers and hence accommodate multiple different types of transactions such as issuing money orders, gift certificates, official checks, payroll checks, check cashing, bill paying, credit card authorization, age verification, and the like.

7 Claims, 5 Drawing Sheets

| | |
|---|---|
| RECORD CODE | A |
| AGENT CODE | 7777777 |
| BILLER CODE | 1008 |
| CUSTOMER ACCOUNT NUMBER | 3642057990 |
| PAID AMOUNT | 8948 |
| PAID FEE AMOUNT | 100 |
| PAID DATE/TIME | 2212001 093542 |
| TRACE NUMBER | 20042518 |
| VOID FLAG | 0 |
| DOWNLOAD STATUS | 0 |
| BUSINESS DATE | 2212001 |
| SEQUENCE NUMBER | 0 |
| VOID TRACE NUMBER | 0 |
| CHECK BANK ACCOUNT NUMBER | 99999999 |
| CHECK NUMBER | 9999 |
| CHECK ROUTING NUMBER | 9999999999 |
| IMAGE TRACE NUMBER | 100107500319100000000 |
| PAYMENT TYPE | 1 |
| INPUT TYPE | 0 |
| OCR STRING | 800036420579900000000000000000000 |
| RAW MICR | 99999999 9999999 999 |
| SOFTWARE RELEASE LEVEL | ENT401Z |

FIG. 5

METHOD AND APPARATUS FOR ELECTRONIC COMMERCE SERVICES AT A POINT OF SALE

FIELD OF THE INVENTION

The present invention is related generally to point of sale financial services and more particularly to a point of sale terminal and data processing system and method of using same for transacting bill payment and other financial services, such as money order purchases, check truncation, age verification, credit and/or debit card purchases, and the like.

BACKGROUND OF THE INVENTION

Point of sale electronic transactions, including credit and debit card transactions, electronic check conversions, age verification, and the like, are becoming increasingly prevalent as technology improvements in data processing equipment and telecommunications bring greater computing power to retail locations. One area of significant volume and importance in point of sale ("POS") electronic transactions is payment of bills, such as utility bills, credit card bills, telephone bills, insurance premiums, and the like. As many as 20 billion bills are estimated to be paid in person each year in the United States. Historically, many such in-person bill payments have been made at "store-front" locations owned and managed by, e.g. the utility company receiving payment. Banks have also provided a service of accepting payment of bills on behalf of utility companies and other billing entities. Increasingly, retail locations such as grocery stores and convenience stores have entered the market of accommodating in-person bill payments. These POS locations are becoming increasingly prevalent and important to in-person bill payment transactions, as utility companies and banks become less willing to incur the costs associated with maintaining store-front locations (in the case of utility companies) and associated with handling the actual payment transactions (in the case of both utility companies and banks).

In addition to handling in-person bill payment, POS locations are increasingly offering many other electronic transactions, such as obtaining authorization for credit card and debit card purchases, electronic money order purchases, age verification, obtaining validation for check purchases, and the like. Typically, a service provider will provide only one type of electronic transaction capability to the POS location. For instance, a credit card authorization service provider will provide the POS location with a terminal for inputting, or "swiping," a credit card and with the necessary telecommunication connections and equipment to connect the terminal to the service bureau, where the credit card purchase can be authorized in real-time. Likewise, a different service provider will provide the POS location with a different terminal and telecommunication interface for providing check validation services. Yet a third service provider might provide yet a third piece of equipment for handling money order purchases at the POS location. This is disadvantageous, as space is often a valuable commodity to retailers and the need for multiple terminals to accommodate multiple electronic transactions requires significant amounts of floor space or counter space and is not cost effective.

Another shortcoming in the prior art is the effort involved in memorializing and verifying prior transactions. This problem is particularly acute in the realm of in-person bill payments. Such a transaction typically involves a bill payer bringing the bill received from, e.g. a utility company (henceforth called a "biller"), into the POS location, such as a convenience store. The store clerk will take the utility bill and will manually input relevant information (such as account number, amount due, and the like) into the bill payment terminal. The store clerk will then receive payment for the bill and will input this information into the POS terminal as well. Inevitably, clerical error will result in the incorrect account being credited, or the account being credited with the wrong dollar amount, or some other error. In such a case, the original bill must be retrieved and the information contained thereon compared to the information input into the system. This requires that the bills be stored and organized for retrieval at the POS location. This requirement places a significant burden on the POS location management and personnel. Several days are typically required to retrieve the bill from the POS location, if it can be located at all, before billing errors or questions can be resolved.

Another disadvantage with prior art solutions to POS financial transactions is that the information stored at the POS terminal may not always be completely up to date. This is because the POS terminals are typically self-contained units that communicate with a base computer system (provided by the service provider) only when necessary to retrieve or send information to the base system. Typically, such terminals are updated on a periodic basis, such as after business hours, with information regarding the types of services to be provided, the types of bills for which payment can be received, and the like. If changes occur during the day, the POS terminal might not have the updated information. This can result in the POS terminal accepting payments for a utility company that is no longer authorizing such POS payments. Likewise, if the POS location itself is no longer authorized to accept payments (perhaps for failure to timely forward the payments to the service provider), then the POS terminal will be unaware of that restriction until the next periodic update.

These and other shortcomings in the prior art can be overcome by employing the present invention, which is described herein with reference to several preferred embodiments.

SUMMARY OF THE INVENTION

In a first aspect, the invention provides for a system for processing point of sale bill payment transactions electronically. The system includes a a point of sale terminal located at a point of sale that comprises a paper handler, a system memory configured to store therein a template of an expected document image, a scanner adjacent the paper handler and configured to make an electronic image of a document inserted in the paper handler, an optical character recognition circuit coupled to the scanner and configured to compare the electronic image received from the scanner with the template stored in the system memory and to convert image data from the electronic image into electronic transaction data, an image memory coupled to the scanner and configured to store therein the electronic image of the document, an input/output device configured to accept transaction information relating to the document; and a communication link coupled to the image memory and to the input/output device. The system also includes a remote data processing device coupled to the point of sale terminal via the communication link that comprises a transaction database configured to receive transaction information from the point of sale terminal, payment processing circuitry coupled to the transaction database and configured to send payment information to a payment service provider, and a remote image database coupled to the point of sale terminal and coupled to the remote data processing device and configured to receive the electronic image stored in the image memory.

In another aspect, the invention provides for a method for processing an in-person bill payment at a point of sale location. The method includes identifying a biller for whom a payment transaction is to be received, obtaining transaction information concerning the payment, receiving payment for the bill and assigning a transaction identifier to the transaction. The method further contemplates scanning at least one transaction document and generating at least one electronic image therefrom, storing each electronic image in an image memory with an image identifier and linking the image identifier to a transaction identifier and transmitting the transaction information to a payment server. Additionally, the method includes receiving from the payment server instructions regarding the transaction and transmitting to an image server a copy of each electronic image and its image identifier and linked transaction identifier.

In yet another aspect, the invention provides for a point of sale terminal for processing electronic transactions comprising paper handling means comprising a paper guide, rollers and a motor driving the rollers and an optical detector adjacent the paper handling means and configured to capture an electronic image of a document inserted in the paper handling means. The terminal also includes an image memory coupled to the optical detector and configured to store therein the electronic image received from the optical detector, an optical character recognition circuit coupled to the optical detector and configured to convert a portion of the electronic image into electronic transaction information, and a magnetic detector adjacent the paper handling means and configured to capture magnetic information stored on the document and to convert the captured magnetic information into electronic transaction information. Additionally, the terminal includes an input device for receiving additional transaction information and instructions, an output device for outputting transaction information, including authorization codes and instructions and a communication circuit configured to transmit the transaction information to at least one remotely located data processing center and to transmit the electronic image stored in the image memory to a remotely located image database, the communication circuit being further configured to receive authorization instructions from the data processing center.

A first advantage of the preferred embodiments of the present invention is the ability to maintain electronic archival records of the transaction documents for subsequent verification and validation. Another advantage of the preferred embodiments of the present invention is the ability to provide multiple services and features from a common point of sale terminal.

These and other features and advantages will be made more clear in connection with the following detailed description of the drawings identified below.

DESCRIPTION OF THE PREFERRED EMBODIMENTS

The making and use of the presently preferred embodiments are discussed below in detail. However, it should be appreciated that the present invention provides many applicable inventive concepts that can be embodied in a wide variety of specific contexts. The specific embodiments discussed below are merely illustrative of specific ways to make and use the invention, and do not limit the scope of the invention.

Figure 1:
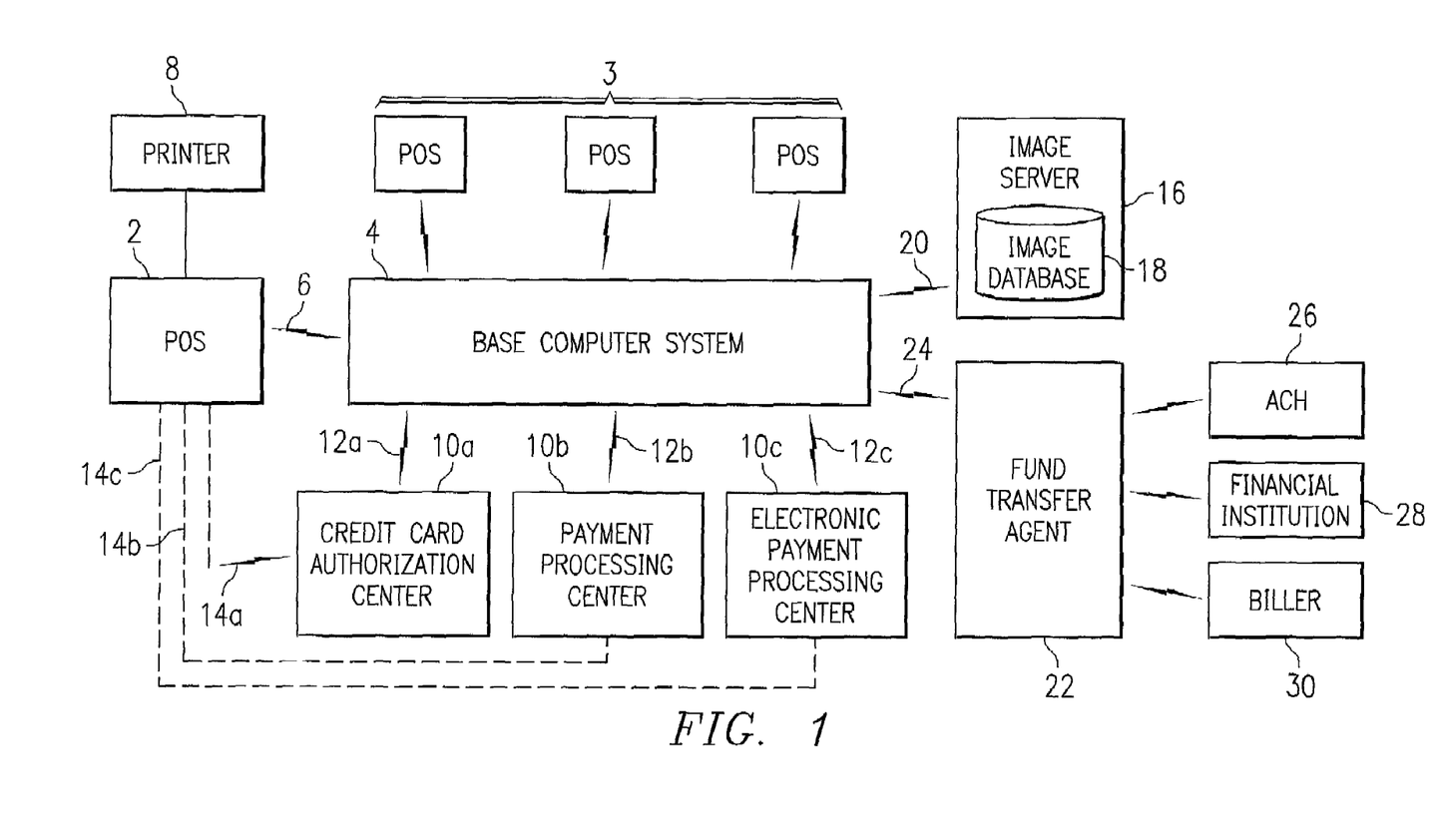
FIG. 1 illustrates a preferred embodiment electronic transaction processing system employing advantageous features of the present invention.

FIG. 1 illustrates a first preferred embodiment system for electronically processing point of sale (POS) financial transactions. POS terminal 2 is located at a retail location, such as a convenience store, grocery store, or similar retail location. Preferably only one POS terminal 2 need be located at each location. Other POS terminals 3 are illustrated in FIG. 1. Each of these POS terminals will be located at a separate POS location. POS terminal 2 will be addressed throughout the following discussion, although the explanation applies equally to POS terminals 3 as well. In the preferred embodiment, POS terminals 2 and 3 are EC5000™ terminals provided by RDM Corporation, Waterloo, Ontario coupled to an Omni 396 or 3300 model Verifone™ terminal. POS terminal is also preferably configured with a printer 8, which may be a thermal printer, dot matrix or other impact printer, inkjet or LaserJet printer, or other well known alternative. In the following discussion, the scanner and terminal are discussed generically as POS terminal 2. One skilled in the art will recognize, however, that in commercial embodiments, these devices are typically separate components, each having its own system memory, and perhaps having its own communication circuitry. In the following discussion, therefore, the various features and functions of the "POS terminal 2" will be understood to be implemented in either a stand-alone scanner device, a terminal device, or a combination of the two.

POS terminal 2 communicates with a "home office" or base computer system 4 of a service provider by way of communication link 6. Communication link is preferably a dial-up connection between the POS terminal 2 and the base computer 4. Alternatively, the communication link 6 could be comprised of a Local Area Network (LAN) or Wide Area Network (WAN) connection. The connection can be made over an existing public switched telephone network, over a packet switched network such as the Internet, using wireless communication channels such as cellular telephone networks, other radio frequency channels, or other communication channels.

Base computer system 4 provides several functions. The base system handles incoming transactions from POS terminal 2 (and POS terminals 3 as well) and responds to those transactions with authorization information, verification information, acknowledgement codes, or other requested data. In some instances, base system 4 merely receives transaction information form POS terminal 2 and acts upon it without responding.

Base system 4 in turn communicates with several other data processing systems. For instance, base system 4 might receive a request for credit card authorization from POS terminal 2. This request will be forwarded by base system 4 to a credit card authorization center 10*a* (typically a service provided by the credit card issuer or by a third party service bureau on behalf of the credit card issuer) by way of communication link 12*a*. Alternatively, POS terminal 2 can communicate directly with credit card authorization center 10*a* by way of communication link 14*a*, thus reducing the processing and communication bandwidth requirement on base system 4.

Base system 4 also communicates with other data processing systems, such as a payment processing center 10*b* for a biller such as a utility company (via communication link 12*b*) and an electronic payment processing center for a financial institution 10*c* (via communication link 12*c*). Payment information is processed by base system 4 and communicated to the appropriate processing center 10*b*, 10*c* as will be discussed in further detail below. One skilled in the art will recognize that multiple credit card authorization centers 10*a*, payment processing centers 10*b*, and electronic payment processing center for financial institutions 10*c* will be part of an overall system, although only one representative example is shown for each type of company. Alternatively, POS terminal 2 can communicate directly with payment processing center 10*b* or electronic payment processing center for financial institution 10*c* via communication links 14*b*, 14*c*, respectively.

Base system 4 also communicates with an image server 16 which includes an image database 18, via communication link 20. Image server 16 provides input/output and database management functions for image database 18. As will be discussed in greater detail below, database 18 stores images of the transaction documents processed at POS terminal 2, such as images of bills that are presented for payment and images of checks that are used for payment.

Also illustrated in FIG. 1 is fund transfer agent 22, which communicates with base system 4 via communication link 24. Fund transfer agent 22 communicates with various third party services, such as with an automated clearinghouse (ACH) service bureau 26, financial institution 28, biller 30, and the like. In the preferred embodiments, fund transfer agent 22 is responsible for ensuring the payment to the individual billers 30 from the funds received at the POS location. In alternative embodiments, base system 4 can communicate directly with the ACH 26, financial institution 28, or biller 30 and can bypass fund transfer agent 22.

Figure 2:
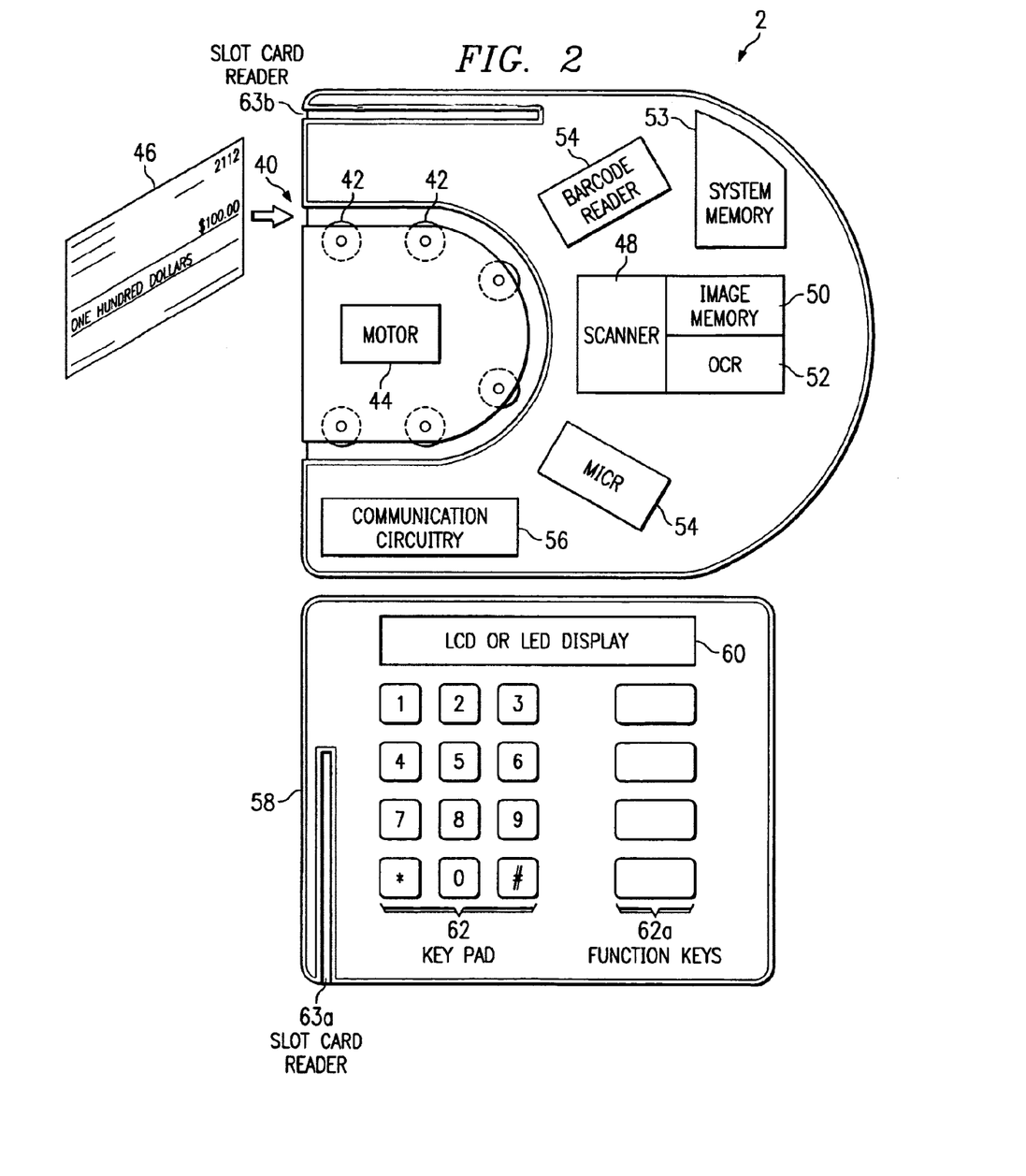
FIG. 2 illustrates a preferred embodiment POS terminal.

Further details regarding POS terminal 2 are provided in FIG. 2. The POS terminal includes a paper guide 40 which receives documents, such as bill stubs and checks, related to a financial transaction. A series of rollers 42, driven by motor 44, operate to pull the document 46 through the terminal 2 as illustrated by the arrow. As it passes through paper guide 40, the document passes before scanner 48 where an electronic image of the document is formed using CCD or other well known imaging technology. The electronic image is preferably compressed using JPEG, MPEG, or other well known image compression technology, and then stored to image memory 50. In addition to storing an electronic image of the document, scanner 48 also provides for optical character recognition (OCR) of the document using OCR processing circuitry 52.

Additionally, the document passes before Magnetic Ink Character Recognition ("MICR") reader 54, where information that is stored on the document in the form of magnetic ink is detected and decoded. The use of MICR readers 54 is well known in the art and is particularly advantageous for electronic processing of checks. POS terminal 2 also contains bar code reader 55, which reads bar code or other optically encoded information. In some embodiments, bar code reader 55 is integrated in with scanner 48.

POS terminal 2 also includes communication circuitry 56, which is responsible for establishing and maintaining communication between POS terminal 2 and base system 4. This circuit preferably includes a modem or network interface card, as well as appropriate logic for programming the POS terminal 2 to establish communication with base system 4 for providing transaction information to the base system, for retrieving authorization, validation, or other transaction data from the base system (or from some other data processing system 10*a*, 10*b*, 10*c*), and for uploading stored information, including images stored in image memory 50 as well as daily activity reports, statistical summaries, and the like.

Also illustrated in FIG. 2 is input/output device 58, which includes an output display 60, such as a LCD or LED display, and input keypads 62 for manually inputting information into POS terminal 2. Keypad 62 also includes a slot and magnetic strip reader 63*a* for use with, e.g. credit cards, debit cards, identification cards, and the like, which use a magnetic medium for data storage. The card can be inserted into the slot and the information stored on the card can be read by the magnetic strip reader 63*a*, as is known in the art. Alternatively, the slot and card reader can be placed adjacent the paper guide 40, as shown by 63*b*.

An exemplary in-person bill payment transaction will now be described in greater detail with reference to FIGS. 3 and 4. The transaction is initiated when a bill payer brings a bill for payment to a POS location, such as a grocery store check-out counter. A clerk receives the bill and payment and initiates POS terminal 2 (shown in FIG. 3) for the transaction, as shown as step 100 of FIG. 4. Initiation is preferably accomplished by pressing an appropriate key on keypad 62, such as a function key 62*a* corresponding to the "Bill Payment" function. The clerk then enters an employee number and optionally other identifying information such as a password, again using keypad 62. In other embodiments, the clerk may have an identification card that can automatically provide an identification code and password using, e.g., a magnetic strip that can be read by card reader 63*a* or 63*b*. The clerk then enters a payee number, also known as a biller number, corresponding to the biller for whom the customer desires to make payment. Optionally, rather than manually entering a biller number, the clerk could select the appropriate biller from a list stored in the system memory (not shown) of POS terminal 2 and displayed on display device 60. This alternative provides an added benefit that only those billers for whom in-person bill payment is authorized will be included on the stored list—thus ensuring that unauthorized payment is not inadvertently accepted.

Figure 4:
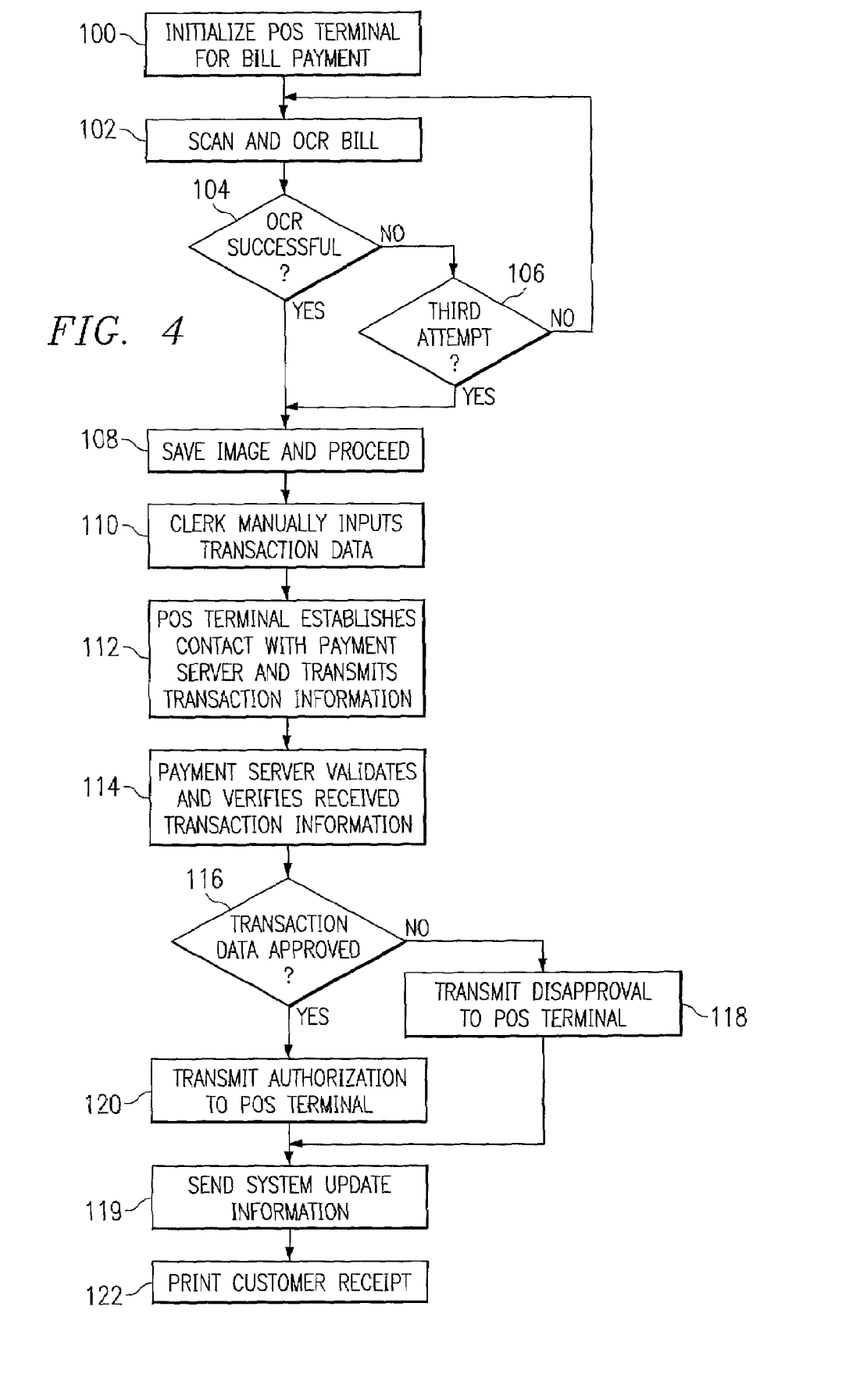
FIG. 4 provides a chart of a preferred embodiment bill payment transaction process flow.

The document or bill 46 is then inserted into paper guide 40 (FIG. 2) by either the clerk or the bill payer, where the bill 46 passes before MICR reader 54, scanner 48, and bar code reader 55, as indicated by step 102 of FIG. 4. Note that, depending upon the document type 46 (i.e. whether a bill or a check or some other type of document), not all readers will be active. For instance, MICR reader 54 is generally used to read magnetic ink on checks, but such magnetic ink is not generally used on bills 46. An advantageous feature of the preferred embodiment is that scanner 48 and OCR circuitry 52 have access to a pre-stored template of how document 46 is laid out. This template is provided by base system 4 and is stored in system memory 53 of POS terminal 2 (FIG. 2). From the pre-stored template, POS terminal 2 knows where OCR readable information is located on the document 46 (and hence where in the scanned image of the document as well) and what type of information is located there (e.g. account number, amount due, and the like). Using the pre-stored template, OCR circuitry 52 converts the image data from scanner 48 into electronic information about the pending transaction. One skilled in the art will recognize that the pre-stored template can be embodied as a stored set of coordinates identifying where on the scanned image certain decodable information (e.g., bar code or alpha-numeric characters) are located. These coordinates are generally relative to a predefined portion of the image of the paper document 46, such as the upper left hand corner. The coordinates can then be defined as so many pixels (picture elements) from the predefined reference point. Along with the stored coordinates, POS terminal 2 also stores predefined routines or algorithms by which to compare the scanned image to the template in order to derive the desired information captured from the scanned document 46. An advantageous feature of the preferred embodiments is that, although a duplicate template is stored at POS terminal 2, the template can be readily updated from base system 4 whenever necessary. As such, the templates can be quickly updated when, for instance, a biller changes the layout of the bill document 46.

As indicated by decision step 104, POS terminal 2 will determine whether a good image was obtained from the scan by determining whether the OCR circuitry 52 was able to decipher the information expected to be found on the bill 46, as indicated by the pre-stored template. If the OCR was not successful, POS terminal 2 will determine whether three attempts have been made at scanning the bill, as indicated by decision step 106. If less than three attempts have been made, POS terminal 2 will instruct the clerk to re-scan the bill by displaying an appropriate error message and instructions on output display 60. If decision step 104 indicates the OCR was successful, or if three attempts have already been made, then the last scanned image is stored to image memory 50 and processing continues, as indicated by step 108.

Each image stored to image memory 50 is assigned a unique identifier number. This identifier number will be linked to a separate unique identifier number that is assigned to each transaction. In the preferred embodiments, the image identifier is generated using the serial number of the POS terminal 2 from which it is created, the date and/or time the image was formed, and a sequence number (i.e., whether the image was the first, second, etc. image scanned on that day by that terminal). Note that while POS terminal 2 is described generically, in the preferred embodiments, the terminal may be implemented as two separate devices that are linked together.

In some embodiments, all information necessary for processing the transaction (except for amount paid) will be obtained by scanning the bill 46 and converting the image into electronic data using OCR circuitry 52, MICR circuitry 54, and/or bar code reader 55. Alternately, however, relevant transaction data is manually input by the store clerk in order to ensure that the transaction data is recorded accurately and completely, as indicated by step 110 of FIG. 4. For instance, the store clerk will manually input the account number from the bill 46 and preferably re-enter the account number a second time. POS terminal 2 will compare the two instances of the account number input by the clerk to ensure that they match. In the event of a mismatch, POS terminal 2 will request that the clerk re-enter the account number. In this way, the possibility that the wrong account will be credited with the payment is minimized. Once the account number has been verified, POS terminal 2 will prompt that the clerk enter in the dollar amount of the bill 46.

Once the transaction information has been entered and an appropriate prompt has been input to POS terminal 2, by for instance pressing an "enter" key, POS terminal 2 will establish communication with base system 4, as illustrated by step 112. As shown in FIG. 3, base system 4 can comprise multiple separate computer systems. In the illustrated embodiment, POS terminal 2 contacts a dedicated payment server 70, which is configured to have sufficient communication and processing bandwidth to communicate with thousands of POS terminals supporting various POS locations. The POS terminal 2 will transmit the transaction information to the payment server 70, such as data identifying the POS location (e.g., an agent code, a clerk identifier, the local date and time, and the like), data identifying the biller data (biller identification number, account number, and the like), and transaction specific information (such as the amount due on the bill, the amount being tendered, payment type such as cash or check, an OCR string obtained from OCR circuitry 52, a MICR string obtained from MICR reader 54, if appropriate, and the like). Note that the amount of payment being tendered and the amount due on the bill are typically not equal. This is because a surcharge is generally added to the amount due on the bill, which surcharge is generally shared between the POS location, i.e. the "agent" and the bill payment service provider. Preferably, the POS terminal 2 will also transmit tracing information, such as the transaction identifier and the image identifier associated with the transaction.

Payment server 70 will validate the received data, verify that the POS location (i.e. the agent) is authorized to receive payments, verify further that the POS location is authorized to receive payments for the particular biller being processed, verify that the payment type (e.g., payment by check) is authorized for that particular biller, and the like, as shown by step 114. In some instances, payment server 70 will determine whether the bill payer is authorized at that time to make a POS location payment. For instance, in some cases, such as when a utility company has discontinued service, a bill payer might be required to pay the bill in person at the utility company and provide a security deposit or the like. Under such circumstances, payment server 70 will determine that in-person payment at the POS terminal is not authorized.

In the preferred embodiments, payment server 70 will further validate the account number received from POS terminal 2 using pre-defined characteristics of the account number. For instance, for a certain biller (identified by the biller identification number) it may be known that the account number must have eleven digits, that that fourth digit must be a "1" or a "0," and that the sum of the digits, when added together, must be an odd value. Other billers will have other pre-defined characteristics associated with their account numbers. One skilled in the art will recognize that a simple algorithm can be employed to validate the characteristics of the account number received against the pre-defined characteristics expected for the biller in order to verify that the account number was correctly input. One should also recognize that such an algorithm will identify an instance wherein the account number was correctly input, but the wrong biller was selected or identified—in which case the clerk can be prompted to correct either the account number or the biller number or both. Preferably, this validation algorithm is stored on the payment server 70 and can be readily updated, preferably by the service provider or alternatively by the biller by logging onto payment server 70 (via appropriate secured connection) and updating the algorithm. In other embodiments, the algorithm could be stored on the biller's server 76 and payment server 70 could communicate with the biller's server 76 in real time for account number validation. This approach is less preferable, however, because it requires an additional layer of interserver communication and network connections in order for payment server 70 to respond to POS terminal 2. IN the presently preferred embodiments, payment server 70 and biller's server 76 cannot access each other's data directly, but only communicate notification of payment processes via, e.g., e-mail or similar electronic notification.

In decision step 116, payment server 70 evaluates whether the transaction received from POS terminal 2 is approved, based upon the above discussed criteria. If the transaction is not approved, payment server 70 returns instructions to POS terminal 2, as indicated at 118. These disapproval instructions may include instructions to execute a pre-stored routine located in system memory of POS terminal 2 to display an appropriate prompt to the clerk such as "Transaction Not Authorized; Do Not Accept Payment."

As step 120 illustrates, the payment server communicates authorization instructions to POS terminal 2 when the transaction data is approved in decision step 116. Such authorization instructions may take the form of an instruction to execute a pre-stored routine on POS terminal 2 to display an appropriate prompt to the clerk such as, "Transaction Authorized; Payment Authorized." In addition, the payment server will transmit to the POS terminal a unique transaction identification number associated with the transaction. In the preferred embodiments, the authorization instructions include instructions for POS terminal 2 to print a customer receipt identifying the relevant details of the transaction, as in step 122. Preferably, the receipt includes information identifying the biller, the account number, the amount paid and by what method ie. check or cash, the time and date of payment, and the unique transaction identifier. Information about the POS location may be included as well. Other instructions may be provided to POS terminal as well, such as a minimum payment requirement (in the case where the bill payer desires to pay less than the full amount of the bill), or special handling instructions such as an instruction not to accept a check payment for the account, a requirement for bill payer signature, and the like.

Note that in addition to transmitting authorization or disapproval instructions, the payment server also transmits system information updates to the POS terminal 2 in step 119. While not directly related to the transaction being processed, the system information update is performed, preferably, each time POS terminal 2 establishes communication with payment server 70. In this way, changes to the payment processing procedures and requirements will be updated continuously, rather than relying upon only periodic (e.g. daily) updates. Such system information updates might include whether the POS location is authorized to accept further payments and updates to the list of billers. Additionally, any changes to the pre-stored OCR templates could be updated during this time, as well as biller status information, fee schedules, and the like. Note that the POS terminal 2 maintains a list of authorized billers in its system memory. A particular POS location can be effectively "removed" from the system by updating its list of authorized billers with a null set. In this way, the POS terminal 2 will not recognize any billers as authorized and hence will not accept any further transaction information. Because the POS terminal will no longer recognize any authorized billers, the terminal is prevented from conducting any further transactions until the POS location agent is re-authorized to use the system, at which time an updated authorized biller list can be sent to the POS terminal.

Figure 5:
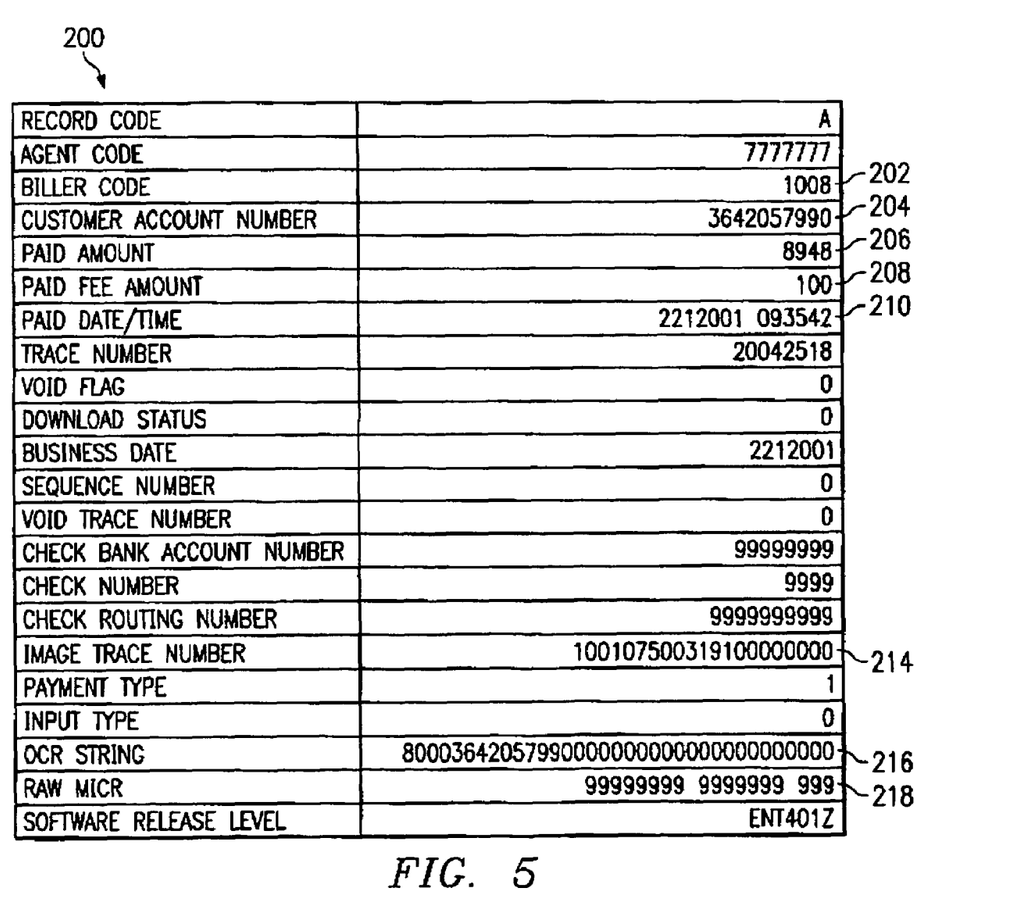
FIG. 5 illustrates an exemplary transaction record used in the preferred embodiments of the invention.

FIG. 5 illustrates an exemplary transaction record 200. Each transaction processed by payment server 70 will have a transaction record stored for it in substantially similar form. The record includes a series of fields providing specific transaction data, including fields 202 and 204 that contain the customer's biller number and account number, respectively. Information regarding the amount paid, the fees paid, and the date and time of payment are stored in fields 206, 208 and 210, respectively. Field 214 contains the image trace number for the scanned image of the transaction document(s) such as the bill 46 itself and possibly a check or money order. In the presently preferred embodiments, money order payments are not processed electronically, hence it may be unnecessary to scan and archive an image of a money order. In future embodiments, however, money orders may be truncated and handled electronically as well. Such processing is within the spirit of the present invention. Note that in some instances, more than one image number will be associated with a particular transaction. Also note that the data that was retrieved from the document(s), such as OCR data 216 and MICR data 218 is also stored in transaction record 200 after having been converted from optical or magnetic format into an electronic format by POS terminal 2 and transmitted to base system 4.

Returning now to FIG. 3, the "back end" portion of the in-person bill payment process will be described in further detail. As illustrated, payment server 70 is preferably connected to a base central computer 72, which further constitutes a portion of base system 4. Central computer 72 acts as a secure repository of all transaction information. Because payment authorization is accomplished via server 70, only those transactions that have been authorized and completed need be communicated to and stored on central computer 72. The dual computer approach also provides an added level of security for the data, as the server 70 can act as a gateway and firewall of sorts between the POS terminals 2 and the central computer 72.

In the preferred embodiments, payment server 70 updates the records stored on central computer 72 every thirty seconds. This ensures that, although central computer 72 is "isolated" from the networked POS terminals, its stored information is up to date. One skilled in the art will recognize that the periodic updates can occur more or less frequently, depending on system traffic and the level of concurrency that is necessary between the server and central computer. In addition, base system 4 may further include a biller notification server 74 that is also coupled to payment server 70. This biller notification server operates as a communication bridge between base system 4 and the bill payment processing center of one or more billers. In this illustrated case only one biller payment processing server 76 is shown connected to the biller notification server 74. Such an arrangement is preferably employed when the bill payment service provider is an authorized agent of the biller and hence the biller is willing to provide direct EDI access to its own data processing system. Upon receipt and authorization of a bill payment for the particular biller, payment server 70 will immediately forward the complete transaction information to biller notification server 74. Biller notification server 74 will in turn forward the transaction information on to the biller's payment processing server 76, either immediately, or on a periodic basis, such as on the quarter hour. Such an arrangement is particularly advantageous in that it ensures that the bill payer will be credited for having made the payment with minimal delay. If payment is made on the due date, timely notification can prevent the imposition of late fees and possibly the added cost and inconvenience of discontinuation of services due to late payment.

Central computer 72 provides yet further verification to the transaction records it receives from payment server 70.

Such further verifications, commonly referred to as "edits" include such things as checking for duplicate entries of the same transaction, ensuring that all necessary data for a transaction has been received and recorded, validating account numbers (as discussed above), validating bank account numbers through similar validation algorithms, ensuring that the correct fees/deductions have been accounted for, and the like.

Figure 3:
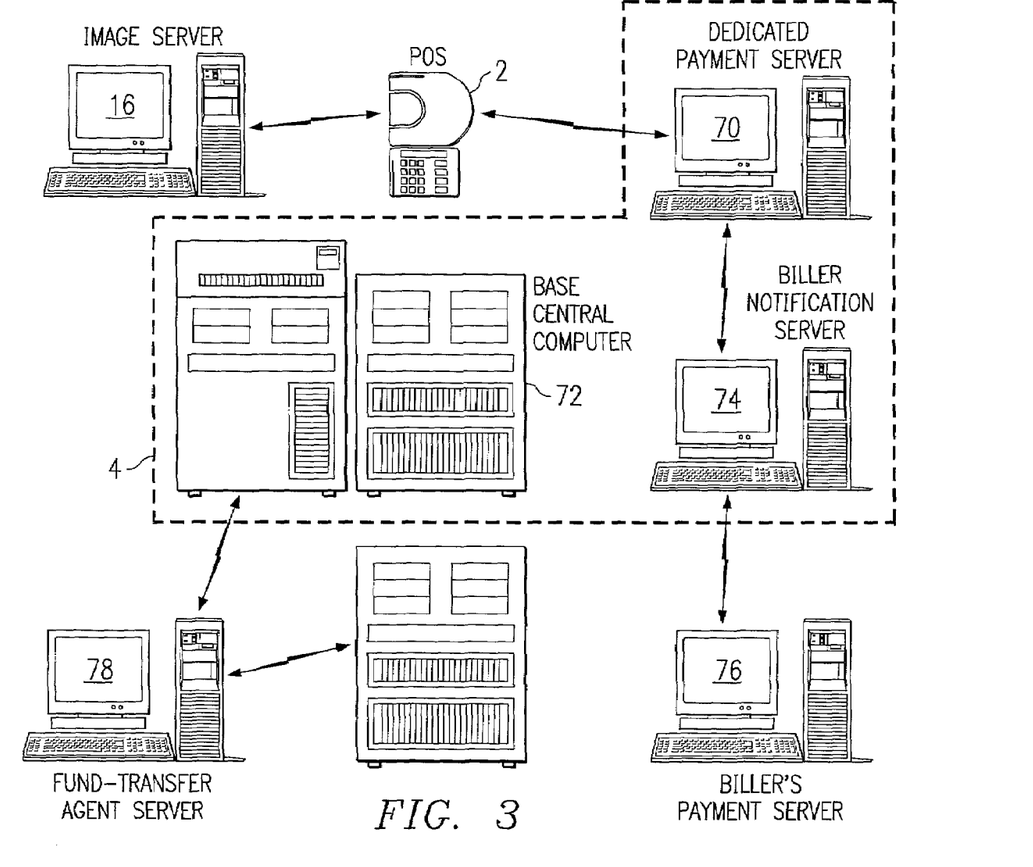
FIG. 3 illustrates another preferred embodiment electronic transaction processing system employing advantageous features of the present invention.

In the preferred embodiments, actual transfer of funds is accomplished using a fund transfer agent, as indicated by server 78 of FIG. 3. The fund transfer agent may be, but is not necessarily part of base system 4. In the presently preferred embodiments, fund transfer agent is a third party, separate from the bill payment service provider. Alternatively, the fund transfer agent service could be provided by the bill payment service provider as well.

In the preferred embodiments, central computer 72 creates a payment fund transfer file at the end of each business day. This fund transfer file is generated from the transaction information that has been uploaded from the POS terminals 2 throughout the day. Specifically, the fund transfer file will include transaction data, including identifying data and financial data, to complete the payment transaction, as is well known to one skilled in the art of electronic bill payment processing. The fund transfer file is transmitted to the fund transfer agent's server 78 for processing. The fund transfer agent will in turn generate the appropriate electronic funds transfer instructions to cause funds to be transferred to the various billers for whom payments had been received (at the POS locations) throughout the day. In this way, the biller receives payment the next day after the bill 46 is paid at the POS location, rather than waiting for several days for the payment to be sent through the mail or for the funds to be transferred from the POS location to the bill paying service and thence from the bill paying service to the biller. Note that a separate electronic fund transfer operation will also take place wherein the funds received by the POS location (i.e. the retailer), less the retailer's share of the service fees, will be transferred to the service provider.

Another aspect regarding operation of POS terminal 2 will now be discussed. In addition to transmitting and logging transaction information to payment server 70 in real time as each transaction is processed, the POS terminal also prepares and prints daily logs or reports to the merchant at the point of sale. In order for the merchant to have a record of a full day's transaction activity, these reports are generally generated after the close of business each day (midnight) to avoid any interruptions, as many POS locations are open for business late in the evening or in some cases 24 hours a day. Each day's reports will include totals for payments received, fees received, total numbers of transactions processed, and the like. Preferably, each POS terminal will have a specific time stored in its system memory at which time the POS terminal will dial into the appropriate server and transmit its end of day reports. These times are preferably staggered to avoid unnecessary network congestion if every POS terminal attempted to transmit its daily report to the server at the same time. In other embodiments, the reports could be generated more or less frequently depending upon the needs of the system, communication bandwidth concerns, typical transaction volume, and the like. Additionally, in some embodiments, a manual report generation function can be implemented. This feature would allow for server 70 to instruct POS terminal 2 to close out its books for the day and to immediately generate and transmit a daily report. This instruction could be sent to POS terminal 2 any time the terminal dials into the server with a transaction, or in other instances, server 70 could itself initiate such a communication with the POS terminal 2 via communication link 6. One skilled in the art will recognized that certain transactions, such as age verification, credit card processing, check validation, and the like require real-time processing and information exchange between POS terminal 2 and server 70. Other processes, such as money orders, gift certificates, and the like, need not be handles in real time, but could instead have the transaction information stored in memory in POS terminal 2 until a convenient, typically pre-arranged, time for uploading the transaction information to server 70.

In addition to preparing end of day reports, POS terminal 2 is also configured to transmit on a nightly basis all of the images stored in image memory 50 (FIG. 2) to image server 16 (FIGS. 1 and 3). As shown in FIG. 1, in some embodiments, images from image memory 50 are transmitted to image server 16. More particularly, as shown by FIG. 3, POS terminal 2 communicates directly with image server 16 via a communication link initiated by communication circuitry 56 of POS terminal 2 (FIG. 2). One skilled in the art will recognize that image server 16 can be configured as a portion of overall base system 4 or can be configured as a separate system provided by a third party other than the bill payment service provider. In the case illustrated in FIG. 3, image server 16 is a separate system operated by a third party. The configuration is a simple matter of design convenience.

It is particularly advantageous to have the images stored in database 18 of image server 16. As described above, each stored image has a unique identification number associated with it and the image identification number is linked to a unique transaction identifier for the transaction to which the image belongs. In this way, images of the transaction documents (such as the actual bill or the actual check used to make payment) can be rapidly retrieved from image server 16, generally by central computer 72 in response to an inquiry from a biller or bill payer. In the preferred embodiments, images are stored in a database 18 of server 16 as an XML based relational database of the images. Each image record has associated with it various index parameters, such as the merchant ID for the originating POS location, the date and time the image was captured, the image identification number, and the like. In the case of an image of a check, information such as the check routing number, checking account number, and amount paid can also be included as a searchable index value.

A further advantage of storing the document images in database 18 is that database server 16 has more processing speed and power than POS terminal 2 has, thus ensuring rapid database search and management. This also means that images do not have to be retrieved from POS terminal 2 (in response to inquiry) during business hours, when POS terminal 2 might be busy transmitting transaction information. Additionally, database server 16 is a much more secure facility for archiving the images than is the remotely located POS terminal 2.

In the preferred embodiments, POS terminal 2 is configured to automatically initiate communication with database server 16 and to upload images from image memory 50 to database 18 when image memory 50 reaches a certain capacity limit. Typically this capacity limit will be perhaps eighty or ninety percent of full capacity, in order to allow POS terminal 2 to continue to operate for a period of time while it attempts to establish communication with database server 16 and upload the images. This feature will typically only be employed during periods of high usage when image memory fills up before the next regularly scheduled upload.

Note that indexing information, such as POS location information, time and date stamps, image identifier numbers, and the like, are also preferably uploaded to the database 18 along with the actual images.

Some customers (i.e. bill payers) may wish to pay for their bills 46 with a check, as opposed to cash. The above described system accommodates and improves upon check payment processing as well. Returning to FIG. 2, after scanning the bill 46 itself and entering the appropriate account and payment information, the clerk next places the customer's check (after it has been filled out and signed by the customer and stamped with the correct electronic check conversion, or "ECC," authorization) into paper guide 40. Motor 44 drives rollers 42 which in turn guide the check through paper guide 40 past MICR reader 54, scanner 48 and bar code reader 55. In this instance, MICR reader 54 will detect the magnetically encoded information on the check document and will convert it into electronic data. In addition, scanner 48 will scan an image of the check and store the image to image memory 50. As above, the image will have a unique identifier attached to it, which identifier will be linked to the transaction identifier assigned to the particular transaction being processed. Note that, in this instance, two images are associated with the particular transaction—the image of the bill stub and the image of the check. A further advantageous feature of the described embodiments is the ability to accept multiple payment forms for a single bill 46. For instance, a bill payer might wish to pay for a single bill 46 using some combination of any of cash, a check, and a money order (this feature is particularly advantageous where multiple residents share a single residence and share the obligation to pay utility bills, for instance). The various payment types and images of the payments (in the case of checks and money orders) can be commonly linked to the particular bill 46 by way of the unique transaction identifier provided by base system 4. One skilled in the art will recognize that the different payment types can be distinguished from one another by way of, e.g., a suffix identifier associated with each payment type. Likewise, each image can share a base image identifier supplemented with an appropriate suffix.

Once the MICR information has been captured by MICR reader 54 and the check has been imaged by scanner 48 (in addition to the clerk typing in the amount of the check on keypad 62), the paper document is no longer needed. At this point, the check itself can be returned to the customer and the check can be handled electronically from that point forward. This process known as check truncation or electronic check conversion greatly increases the overall efficiency of the system and results in significant cost savings. Because the paper document need not be processed, the handling, processing and storage costs are greatly reduced. The preferred embodiment system, in which the check is scanned and imaged, the image is stored to an archive, and the image is uniquely identified and linked to the transaction allows for this advantageous feature. Once the check has been scanned and imaged, the check can be returned to the customer for safekeeping.

The electronic check information is transmitted from POS terminal 2 to payment server 70 in real-time and from there to central computer 72. The electronic check information is subsequently forwarded to an ACH service for processing as is well known in the art. In an alternate embodiment, the ACH service could be provided from the central computer 72 directly.

One skilled in the art will recognize that the above described system can be used for check verification purposes for retail purchases as well as for bill payments. In one embodiment, POS terminal 2 will automatically dial a check verification service and will receive automatic verification and check approval. Typically, this is done via a negative database, in which a third party service provider maintains a nationwide or regional database of known bad check writers, indexed by name, checking account number, driver's license number, or some similar identification scheme.

Many other transactions can be accommodated by POS terminal 2 as well. For instance, POS terminal 2 can also be configured to provide for money order purchases. As shown in FIG. 1, POS terminal 2 preferably includes a printer 8 by which money orders, gift certificates & pay roll checks can be printed. This printer 8 is optionally the same printer as that which prints out customer receipts or a separate printer configured for printing money orders. In the presently preferred embodiment, however, the Verifone™ terminal has its own integrated printer for printing out customer receipts and merchant end of day and shift reports. A customer or clerk will input the relevant transaction information, such as the desired dollar amount of the money order, payment type, and the like. This information is stored in the terminal's memory until an automatic close out process takes place at a preset time, such as at the end of business day (midnight). The terminal then dials into the money order processors system and transmits the data for that days sales activity. Alternatively, the information could be communicated directly to a third party service center 10a for processing. One skilled in the art will recognize that additional security processes, such as the use of user identification codes and passwords should be employed in transactions of this sort to prevent abuse.

Other transactions can be accommodated as well, such as gift certificates, pay roll checks, official checks, debit cards, credit cards, electronic benefits transfer, prepaid pin based cellular products, local and long distance prepaid cards, real time money order transfer, age verification and the like. In each instance, POS terminal 2 is configured to obtain the necessary information for the transaction, such as by scanning and OCR'ng a document, reading MICR or bar code information encoded on a document, or by reading a magnetically encoded card or the like, or by manual entry of transaction via keyboard 62 or some other input/output device (e.g. a touch screen, pointing device, speech recognition circuitry, a bar code wand reader, and the like). POS terminal 2 will then initiate communication with the appropriate service provider, either directly or via base system 4, and will transmit the transaction information and receive back authorization, verification, or further instructions. One skilled in the art will recognize that numerous applications can be accommodated in this fashion. This feature is particularly advantageous in that multiple services can be accommodated from a single POS terminal, thus saving in counter space and in employee training costs.

It will, of course, be understood that there could be several modifications of the present invention in its various aspects. For example POS terminal is illustrated as a specialized terminal device. Alternatively, the terminal could be a general purpose computer running appropriate software and configured with a scanner and the like hardware to provide the described functionality. Additionally, the communication link between POS terminal 2 and base system 4 can be a dial-up connection or can alternatively be an always on connection over a public network such as the Internet, or over a private or virtual private network. While image database 18 is shown as residing on a single server, it could alternatively be a distributed database residing on several computers, or could reside on the central computer, or some other computer comprising the base system. While the bill payment service provider is described herein as a separate service provider, the service could be provided by a financial institution or by a large retailer chain, or by any of the other companies and service providers described herein. Many other variations, modifications, and extensions to the described preferred embodiments will be apparent to one skilled in the art. As such, the scope of the invention should not be limited by the particular embodiments herein described but should be only defined by the appended claims and equivalents thereof.

We claim:

1. A method for processing an in-person bill payment at a point of sale location, comprising:
   identifying a biller for whom payment of a payment transaction is to be received;
   obtaining transaction information concerning the payment;
   receiving payment for the bill;
   assigning a transaction identifier to the transaction;
   scanning at least one transaction document and generating at least one electronic image therefrom;
   storing each electronic image in an image memory with an image identifier and linking the image identifier to a transaction identifier;
   transmitting the transaction information to a payment server;
   receiving from the payment server instructions regarding the transaction; and
   transmitting to an image server a copy of each electronic image and the image identifier and linked transaction identifier.

2. The method of claim 1 further comprising:
   storing the transmitted transaction information in a transaction database;
   storing the transmitted electronic image and identifiers in an image database; and
   forwarding selected transaction information to the biller and forwarding at least a portion of the received payment to the biller.

3. The method of claim 1 further comprising:
   detecting magnetically stored information located on the at least one transaction document and converting the magnetically stored information into electronic transaction information.

4. The method of claim 1 further comprising generating transaction information from said electronic image through optical character recognition.

5. The method of claim 4 wherein the transaction information is generated by comparing the electronic image to a pre-stored template containing an expected electronic image.

6. The method of claim 1 further comprising receiving from the payment server additional system update instructions.

7. The method of claim 6 wherein said system update instructions comprise a list of billers for whom in-person bill payment is authorized.

* * * * *